(12) United States Patent
Van Der Linde et al.

(10) Patent No.: US 12,545,923 B2
(45) Date of Patent: Feb. 10, 2026

(54) MUTANT GENE CONFERRING A COMPACT GROWTH PHENOTYPE IN WATERMELON

(71) Applicant: RIJK ZWAAN ZAADTEELT EN ZAADHANDEL B.V., De Lier (NL)

(72) Inventors: Lilian Van Der Linde, De Lier (NL); Sara Movahedi, De Lier (NL)

(73) Assignee: RIJK ZWAAN ZAADTEELT EN ZAADHANDEL B.V., De Lier (NL)

( * ) Notice: Subject to any disclaimer, the term of this patent is extended or adjusted under 35 U.S.C. 154(b) by 186 days.

(21) Appl. No.: 18/155,904

(22) Filed: Jan. 18, 2023

(65) Prior Publication Data
US 2023/0212601 A1 Jul. 6, 2023

Related U.S. Application Data

(63) Continuation-in-part of application No. PCT/EP2021/070157, filed on Jul. 19, 2021, which is a continuation-in-part of application No. PCT/EP2020/070588, filed on Jul. 21, 2020.

(51) Int. Cl.
*C12N 15/82* (2006.01)
*C07K 14/415* (2006.01)

(52) U.S. Cl.
CPC ........ *C12N 15/8262* (2013.01); *C07K 14/415* (2013.01)

(58) Field of Classification Search
None
See application file for complete search history.

(56) References Cited

U.S. PATENT DOCUMENTS

2018/0184604 A1* 7/2018 Van Der Linde .... C12Q 1/6895

FOREIGN PATENT DOCUMENTS

| WO | 2017/042270 A1 | 3/2017 |
| WO | 2019/034364 A1 | 2/2019 |

OTHER PUBLICATIONS

Int'l Search Report and Written Opinion dated Sep. 22, 2021, issued in Int'l App. No. PCT/EP2021/070157.

* cited by examiner

*Primary Examiner* — Charles Logsdon
*Assistant Examiner* — Jessica Nicole Stockdale
(74) *Attorney, Agent, or Firm* — Duane Morris LLP; Thomas J. Kowalski (57) ABSTRACT

The present invention relates to a mutant Cullin1 gene which when present in a watermelon (*Citrullus lanatus*) plant leads to a compact growth phenotype that enables efficient cultivation. The invention also relates to watermelon plants comprising the mutant Cullin1 gene. The mutant Cullin1 gene provides watermelon plants with a compact growth phenotype, i.e. comprising shorter internode length and/or a smaller leaf area when compared to watermelon plants not comprising the mutant Cullin1 gene. The invention further relates to the use of the mutant Cullin1 gene for the identification and development of a plant showing a compact growth phenotype.

24 Claims, 8 Drawing Sheets

Specification includes a Sequence Listing.

Fig. 1A

| Name | | Sequence |
|---|---|---|
| SEQ ID NO:1 | Wild type *Cullin1* gene nucleotide sequence | ATGACAATGGGCGAGCGGAAGACTATTGACTTGGAACAA GGATGGGAGTTTATGCAGAAGGGAATCACAAAGTTGAAG AACATTCTTGAGGGCTTGCCTGAGCCTCAGTTCAGCTCCG AGGACTACATGATGCTTTATACCACCATATACAACATGTG CACACAAAAGCCGCCACATGATTACTCCCAGCAGCTATA CGATAAATACCGTGAATCTTTTGAGGAGTATATCACTTCT ATGGTCTTACCATCCTTGAGGGAGAAGCATGACGAGTTC ATGTTGAGAGAACTGGTCAAAAGGTGGACGAACCATAAA GTCATGGTGAGGTGGCTTTCTCGCTTCTTCCACTATCTTG ACCGATACTTCATTGCTCGAAGATCACTTCCACCTCTCAA CGAAGTTGGCCTCACATGCTTCCGTGAATTGGTGTACAAA GAGCTAAACAGTAAAGTGAGGGATGCAGTAATTTCATTG ATTGATCAAGAACGTGAAGGAGAGCAGATTGACAGAGCT CTACTGAAGAATGTATTAGATATATTTGTGGAAATTGGGA TGGGGCAAATGGATTACTATGAAAATGACTTTGAAGCTG CCATGCTTAAAGATACTGCTGCTTATTACTCTAGGAAGGC TTCCAATTGGATCCTAGAAGATTCTTGTCCCGATTATATG CTAAAAGCAGAGGAGTGCTTGAAACGAGAAAAGGATAG AGTTTCTCACTATTTGCACTCTAGTAGCGAGCCAAAGTTA TTAGAGAAAGTTCAACATGAACTGTTATCTGTGTATGCTA CTCAACTGCTGGAAAAAGAGCATTCAGGATGCCATGCAT TGCTTAGAGATGACAAGGTGGAAGATTTGTCAAGGATGT TCCGCCTCTTCTCCAAAATACCCAAGGGATTGGACCCAGT TTCCAACATATTTAAGCAGCATGTCACTGCTGAAGGAAC AGCATTGGTCAAACAGGCAGAAGATGCTGCAAGTAACAA GAAGGCCGAGAAAAAGGACATAGTTGGTCTGCAGGAAC AGGTTTTTGTAAGAAAAGTGATTGAGCTTCACGACAAGT ACTTGGCTTACGTGAATGATTGTTTCCAAAACCACACACT TTTTCACAAGGCTCTCAAGGAAGCTTTTGAAGTCTTTTGC |

Fig. 1B

```
AATAAGGGTGTTGCTGGAAGTTCTAGTGCAGAATTACTTG
CTACCTTTTGTGATAACATCCTTAAGAAAGGTGGGAGCG
AGAAGTTGAGTGATGAAGCAATTGAGGAGACACTTGAGA
AGGTCGTGAAGTTGCTGGCATACATCTGCGACAAAGATC
TGTTTGCTGAATTCTATAGAAAAAACTTGCCCGAAGGCT
TCTCTTTGACAAGAGTGCCAACGATGACCATGAGAGAAG
TATATTGACCAAATTGAAGCAACAATGTGGTGGCCAGTT
CACCTCTAAGATGGAGGGGATGGTCACTGATTTGACTTTG
GCAAGGGAGAACCAAACTAGTTTCGAGGAGTATCTGAGC
AATAATCCACAAGCTAGTCCTGGAATCGACTTGACTGTCA
CTGTTTTGACTACTGGCTTTTGGCCAAGCTACAAGTCTTTT
GACCTCAACCTGCCGGCAGAGATGGTAAAGTGTGTTGA
AGTTTTCAGAGAGTTCTATCAAACAAAAACAAAGCATAG
AAAACTTACATGGATTTACTCATTGGGTACCTGTAACATC
AGCGGAAAATTTGAACCGAAAACGATGGAGCTGATTGTA
ACAACTTATCAGGCTTCTGCCCTGCTGCTATTCAATTCCT
CAGATAGATTAAGTTATTCCGAGATCATGACACAATTAA
ATTTGAGTGACGATGATGTTGTTAGACTGCTCCACTCATT
GTCATGTGCCAAGTATAAAATTCTTAATAAGGAGCCGAA
CACGAAAACCATCTCTCCGAATGATCATTTTGAGTTCAAT
GCAAAATTCTCCGACAAAATGAGGAGAATAAAGATCCCT
CTTCCGCCTGTGGATGAGAAAAAGAAAGTCATTGAAGAT
GTTGACAAGGATCGAAGGTATGCTATTGATGCCTCAATC
GTGCGTATCATGAAGAGTCGGAAAGTTCTGGGTCATCAG
CAGCTAGTGATGGAGTGCGTCGAGCAATTGGGTCGTATG
TTCAAGAGAGAGACAAAGACAACCCCCACTTGTTTAGGT
ACTTGGCTTGATCTTGCCTTAACCATGGGCAAGAGTGGTG
GTCTGGTGCTATTTGATATAGCATGA
```

Fig. 1C

| SEQ ID NO:2 | Wild type Cullin1 Protein sequence | MTMGERKTIDLEQGWEFMQKGITKLKNILEGLPEPQFSSED YMMLYTTIYNMCTQKPPHDYSQQLYDKYRESFEEYITSMV LPSLREKHDEFMLRELVKRWTNHKVMVRWLSRFFHYLDRY FIARRSLPPLNEVGLTCFRELVYKELNSKVRDAVISLIDQERE GEQIDRALLKNVLDIFVEIGMGQMDYYENDFEAAMLKDTA AYYSRKASNWILEDSCPDYMLKAEECLKREKDRVSHYLHS SSEPKLLEKVQHELLSVYATQLLEKEHSGCHALLRDDKVED LSRMFRLFSKIPKGLDPVSNIFKQHVTAEGTALVKQAEDAAS NKKAEKKDIVGLQEQVFVRKVIELHDKYLAYVNDCFQNHT LFHKALKEAFEVFCNKGVAGSSSAELLATFCDNILKKGGSE KLSDEAIEETLEKVVKLLAYICDKDLFAEFYRKKLARRLLFD KSANDDHERSILTKLKQQCGGQFTSKMEGMVTDLTLAREN QTSFEEYLSNNPQASPGIDLTVTVLTT<u>G</u>FWPSYKSFDLNLPA EMVKCVEVFREFYQTKTKHRKLTWIYSLGTCNISGKFEPKT MELIVTTYQASALLLFNSSDRLSYSEIMTQLNLSDDDVVRLL HSLSCAKYKILNKEPNTKTISPNDHFEFNAKFSDKMRRIKIPL PPVDEKKKVIEDVDKDRRYAIDASIVRIMKSRKVLGHQQLV MECVEQLGRMFKRETKTTPTCLGTWLDLALTMGKSGGLVL FDIA |

Fig. 1D

| SEQ ID NO:3 | Mutant Cullin1 gene nucleotide sequence | ATGACAATGGGCGAGCGGAAGACTATTGACTTGGAACAAGGATGGGAGTTTATGCAGAAGGGAATCACAAAGTTGAAGAACATTCTTGAGGGCTTGCCTGAGCCTCAGTTCAGCTCCGAGGACTACATGATGCTTTATACCACCATATACAACATGTGCACACAAAAGCCGCCACATGATTACTCCCAGCAGCTATACGATAAATACCGTGAATCTTTTGAGGAGTATATCACTTCTATGGTCTTACCATCCTTGAGGGAGAAGCATGACGAGTTCATGTTGAGAGAACTGGTCAAAAGGTGGACGAACCATAAAGTCATGGTGAGGTGGCTTTCTCGCTTCTTCCACTATCTTGACCGATACTTCATTGCTCGAAGATCACTTCCACCTCTCAACGAAGTTGGCCTCACATGCTTCCGTGAATTGGTGTACAAAGAGCTAAACAGTAAAGTGAGGGATGCAGTAATTTCATTGATTGATCAAGAACGTGAAGGAGAGCAGATTGACAGAGCTCTACTGAAGAATGTATTAGATATATTTGTGGAAATTGGGATGGGGCAAATGGATTACTATGAAAATGACTTTGAAGCTGCCATGCTTAAAGATACTGCTGCTTATTACTCTAGGAAGGCTTCCAATTGGATCCTAGAAGATTCTTGTCCCGATTATATGCTAAAAGCAGAGGAGTGCTTGAAACGAGAAAAGGATAGAGTTTCTCACTATTTGCACTCTAGTAGCGAGCCAAAGTTATTAGAGAAAGTTCAACATGAACTGTTATCTGTGTATGCTACTCAACTGCTGGAAAAAGAGCATTCAGGATGCCATGCATTGCTTAGAGATGACAAGGTGGAAGATTTGTCAAGGATGTTCCGCCTCTTCTCCAAAATACCCAAGGGATTGGACCCAGTTTCCAACATATTTAAGCAGCATGTCACTGCTGAAGGAACAGCATTGGTCAAACAGGCAGAAGATGCTGCAAGTAACAAGAAGGCCGAGAAAAAGGACATAGTTGGTCTGCAGGAACAGGTTTTTGTAAGAAAAGTGATTGAGCTTCACGACAAGTACTTGGCTTACGTGAATGATTGTTTCCAAAACCACACACTTTTTCACAAGGCTCTCAAGGAAGCTTTTGAAGTCTTTTGCAATAAGGGTGTTGCTGGAAGTTCTAGTGCAGAATTACTTGCTACCTTTTGTGATAACATCCTTAAGAAAGGTGGGAGCG |

Fig. 1E

```
AGAAGTTGAGTGATGAAGCAATTGAGGAGACACTTGAGA
AGGTCGTGAAGTTGCTGGCATACATCTGCGACAAAGATC
TGTTTGCTGAATTCTATAGAAAAAACTTGCCCGAAGGCT
TCTCTTTGACAAGAGTGCCAACGATGACCATGAGAGAAG
TATATTGACCAAATTGAAGCAACAATGTGGTGGCCAGTT
CACCTCTAAGATGGAGGGGATGGTCACTGATTTGACTTTG
GCAAGGGAGAACCAAACTAGTTTCGAGGAGTATCTGAGC
AATAATCCACAAGCTAGTCCTGGAATCGACTTGACTGTCA
CTGTTTTGACTACTGACTTTTGGCCAAGCTACAAGTCTTTT
GACCTCAACCTGCCGGCAGAGATGGTAAAGTGTGTTGAA
GTTTTCAGAGAGTTCTATCAAACAAAAACAAAGCATAGA
AAACTTACATGGATTTACTCATTGGGTACCTGTAACATCA
GCGGAAAATTTGAACCGAAAACGATGGAGCTGATTGTAA
CAACTTATCAGGCTTCTGCCCTGCTGCTATTCAATTCCTC
AGATAGATTAAGTTATTCCGAGATCATGACACAATTAAA
TTTGAGTGACGATGATGTTGTTAGACTGCTCCACTCATTG
TCATGTGCCAAGTATAAAATTCTTAATAAGGAGCCGAAC
ACGAAAACCATCTCTCCGAATGATCATTTTGAGTTCAATG
CAAAATTCTCCGACAAAATGAGGAGAATAAAGATCCCTC
TTCCGCCTGTGGATGAGAAAAAGAAAGTCATTGAAGATG
TTGACAAGGATCGAAGGTATGCTATTGATGCCTCAATCGT
GCGTATCATGAAGAGTCGGAAAGTTCTGGGTCATCAGCA
GCTAGTGATGGAGTGCGTCGAGCAATTGGGTCGTATGTTC
AAGAGAGAGACAAAGACAACCCCCACTTGTTTAGGTACT
TGGCTTGATCTTGCCTTAACCATGGGCAAGAGTGGTGGTC
TGGTGCTATTTGATATAGCATGA
```

Fig. 1F

| SEQ ID NO:4 | Mutant Cullin1 protein sequence | MTMGERKTIDLEQGWEFMQKGITKLKNILEGLPEPQFSSED YMMLYTTIYNMCTQKPPHDYSQQLYDKYRESFEEYITSMV LPSLREKHDEFMLRELVKRWTNHKVMVRWLSRFFHYLDRY FIARRSLPPLNEVGLTCFRELVYKELNSKVRDAVISLIDQERE GEQIDRALLKNVLDIFVEIGMGQMDYYENDFEAAMLKDTA AYYSRKASNWILEDSCPDYMLKAEECLKREKDRVSHYLHS SSEPKLLEKVQHELLSVYATQLLEKEHSGCHALLRDDKVED LSRMFRLFSKIPKGLDPVSNIFKQHVTAEGTALVKQAEDAAS NKKAEKKDIVGLQEQVFVRKVIELHDKYLAYVNDCFQNHT LFHKALKEAFEVFCNKGVAGSSSAELLATFCDNILKKGGSE KLSDEAIEETLEKVVKLLAYICDKDLFAEFYRKKLARRLLFD KSANDDHERSILTKLKQQCGGQFTSKMEGMVTDLTLAREN QTSPEEYLSNNPQASPGIDLTVTVLTTDFWPSYKSFDLNLPA EMVKCVEVFREFYQTKTKHRKLTWIYSLGTCNISGKFEPKT MELIVTTYQASALLLFNSSDRLSYSEIMTQLNLSDDDVVRLL HSLSCAKYKILNKEPNTKTISPNDHFEFNAKFSDKMRRIKIPL PPVDEKKKVIEDVDKDRRYAIDASIVRIMKSRKVLGHQQLV MECVEQLGRMFKRETKTTPTCLGTWLDLALTMGKSGGLVL FDIA |

FIG. 2

| Name | Primer Sequence | Haplotype |
|---|---|---|
| SEQ ID NO:5 | GACTGTCACTGTTTTGACTACTGGCTTT TGGCCAAGCTACAAGTCTTTTGACCTCA ACCTGCC | Wildtype, A |
| SEQ ID NO:6 | GACTGTCACTGTTTTGACTACTGACTTT TGGCCAAGCTACAAGTCTTTTGACCTCA ACCTGCC | Mutant, B |

SEQUENCE LISTING

```
Sequence total quantity: 6
SEQ ID NO: 1             moltype = DNA   length = 2232
FEATURE                  Location/Qualifiers
misc_feature             1..2232
                         note = Wild type cullin1 gene
source                   1..2232
                         mol_type = genomic DNA
                         organism = Citrullus lanatus
SEQUENCE: 1
atgacaatgg gcgagcggaa gactattgac ttggaacaag gatgggagtt tatgcagaag   60
ggaatcacaa agttgaagaa cattcttgag ggcttgcctg agcctcagtt cagctccgag  120
gactacatga tgctttatac caccatatac aacatgtgca cacaaaagcc gccacatgat  180
tactcccagc agctatacga taaataccgt gaatcttttg aggagtatat cacttctatg  240
gtcttaccat ccttgaggga gaagcatgac gagttcatgt tgagagaact ggtcaaaagg  300
tggacgaacc ataaagtcat ggtgaggtgg cttttctcgt tcttccacta tcttgaccga  360
tacttcattg ctcgaagatc acttccacct ctcaacgaag ttggcctcac atgcttccgt  420
gaattggtgt acaagagct aaacagtaaa gtgagggatg cagtaatttc attgattgat  480
caagaacgtg aaggagagca gattgacaga gctctactga agaatgtatt agatatattt  540
gtggaaattg ggatggggca aatggattac tatgaaaatg actttgaagc tgccatgctt  600
aaagatactg ctgcttatta ctctaggaag gcttccaatt ggatcctaga agattcttgt  660
cccgattata tgctaaaagc agaggagtgc ttgaaacgag aaaaggatag agtttctcac  720
tatttgcact ctagtagcga gccaaagtta ttagagaaag ttcaacatga actgttatct  780
gtgtatgcta ctcaactgct ggaaaaagag cattcaggat gctgcatt gctttagagat  840
gacaaggtgg aagatttgtc aaggatgttc cgcctcttct ccaaaatacc caagggattg  900
gacccagttt ccaacatatt taagcagcat gtcactgctg aaggaacagc attggtcaaa  960
caggcagaag atgctgcaag taacaagaag gccgagaaaa aggacatagt tggtctgcag 1020
gaacaggttt ttgtaagaaa agtgattgag cttcacgaca agtacttggc ttacgtgaat 1080
gattgtttcc aaaaccacac acttttttcac aaggctctca aggaagcttt tgaagtcttt 1140
tgcaataagg gtgttgctgg aagttctagt gcagaattac ttgctacctt ttgtgataac 1200
atccttaaga aaggtgggag cgagaagttg agtgatgaag caattgagga gacacttgag 1260
aaggtcgtga agttgctggc atacatctgc gacaaagatc tgtttgctga attctataga 1320
aaaaaacttg cccgaaggct tctctttgac aagagtgcca acgatgacca tgagagaagt 1380
atattgacca aattgaagca caatgtggt ggccagttca cctctaagat ggaggggatg 1440
gtcactgatt tgactttggc aagggagaac caaactagtt tcgaggagta tctgagcaat 1500
aatccacaag ctagtcctgg aatcgacttg actgtcactg ttttgactac tggcttttgg 1560
ccaagctaca agtcttttga cctcaacctg ccggcagaga tggtaaagtg tgttgaagtt 1620
ttcagagagt tctatcaaac aaaaacaaag catagaaaac ttacatggat ttactcattg 1680
ggtacctgta acatcagcgg aaaatttgaa ccgaaaacga tggagctgat tgtaacaact 1740
tatcaggctt ctgccctgct gctattcaat tcctcagata gattaagtta ttccgagatc 1800
atgacacaat taaatttgag tgacgatgat gttgttaac tgctccactc attgtcatgt 1860
gccaagtata aaattcttaa taggagccg aacacgaaaa ccatctctcc gaatgatcat 1920
tttgagttca atgcaaaatt ctccgacaaa atgaggagaa taagatccc tcttccgcct 1980
gtggatgaga aaagaaagt cattgaagat gttgacaagg atcgaaggta tgctattgat 2040
gcctcaatcg tgcgtatcat gaaagtcgg aaagttctgg gtcatcagca gctagtgatg 2100
gagtgcgtcg agcaattggg tcgtatgttc aagagagaa caaagacaac ccccacttgt 2160
ttaggtactt ggcttgatct tgccttaacc atgggcaaga gtggtggtct ggtgcattt 2220
gatatagcat ga                                                     2232

SEQ ID NO: 2             moltype = AA   length = 743
FEATURE                  Location/Qualifiers
REGION                   1..743
                         note = Wild type cullin1 protein
source                   1..743
                         mol_type = protein
                         organism = Citrullus lanatus
SEQUENCE: 2
MTMGERKTID LEQGWEFMQK GITKLKNILE GLPEPQFSSE DYMMLYTTIY NMCTQKPPHD   60
YSQQLYDKYR ESFEEYITSM VLPSLREKHD EFMLRELVKR WTNHKVMVRW LSRFFHYLDR  120
YFIARRSLPP LNEVGLTCFR ELVKELNSK VRDAVISLID QEREGEQIDR ALLKNVLDIF  180
VEIGMGQMDY YENDFEAAML KDTAAYYSRK ASNWILEDSC PDYMLKAEEC LKREKDRVSH  240
YLHSSSEPKL LEKVQHELLS VYATQLLEKE HSGCHALLRD DKVEDLSRMF RLFSKIPKGL  300
DPVSNIFKQH VTAEGTALVK QAEDAASNKK AEKKDIVGLQ EQVFVRKVIE LHDKYLAYVN  360
DCFQNHTLFH KALKEAFEVF CNKGVAGSSS AELLATFCDN ILKKGGSEKL SDEAIEETLE  420
KVVKLLAYIC DKDLFAEFYR KKLARRLLFD KSANDDHERS ILTKLKQQCG GQFTSKMEGM  480
VTDLTLAREN QTSFEEYLSN NPQASPGIDL TVTVLTTGFW PSYKSFDLNL PAEMVKCVEV  540
FREFYQTKTK HRKLTWIYSL GTCNISGKFE PKTMELIVTT YQASALLLFN SSDRLSYSEI  600
MTQLNLSDDD VVRLLHSLSC AKYKILNKEP NTKTISPNDH FEFNAKFSDK MRRIKIPLPP  660
VDEKKKVIED VDKDRRYAID ASIVRIMKSR KVLGHQQLVM ECVEQLGRMF KRETKTTPTC  720
LGTWLDLALT MGKSGGLVLF DIA                                          743

SEQ ID NO: 3             moltype = DNA   length = 2232
FEATURE                  Location/Qualifiers
misc_feature             1..2232
                         note = Mutant Cullin1 gene
source                   1..2232
                         mol_type = genomic DNA
                         organism = Citrullus lanatus
SEQUENCE: 3
```

```
atgacaatgg gcgagcgaaa gactattgac ttggaacaag gatgggagtt tatgcagaag    60
ggaatcacaa agttgaagaa cattcttgag ggcttgcctg agcctcagtt cagctccgag   120
gactacatga tgcttatac caccatatac aacatgtgca cacaaaagcc gcccatgat    180
tactcccagc agctatacga taaataccgt gaatcttttg aggagtatat cacttctatg   240
gtcttaccat ccttgaggga gaagcatgac gagttcatgt tgagagaact ggtcaaaagg   300
tggacgaacc ataaagtcat ggtgaggtgg cttttctcgct tcttccacta tcttgaccga   360
tacttcattg ctcgaagatc acttccacct ctcaacgaag ttggcctcac atgcttccgt   420
gaattggtgt acaaagagct aaacagtaaa gtgagggatg cagtaatttc attgattgat   480
caagaacgtg aaggagaca gattgacaga gctctactga gaaatgtatt agatatattt   540
gtggaaattg ggatggggca aatggattac tatgaaaatg actttgaagc tgccatgctt   600
aaagatactg ctgcttatta ctctaggaag gcttccaatt ggatcctaga agattcttgt   660
cccgattata tgctaaaagc agaggagtgc ttgaaacgag aaaaggatag agtttctcac   720
tatttgcact ctagtagcga gccaaagtta ttagagaag ttcaacatga actgttatct   780
gtgtatgcta ctcaactgct ggaaaaagag cattcaggat gccatgcatt gcttagagat   840
gacaaggtgg aagatttgtc aaggatgttc cgcctcttct ccaaaatacc caagggattg   900
gacccagttt ccaacatatt taagcagcat gtcactgctg aaggaacagc attggtcaaa   960
caggcagaag atgctgcaag taacaagaag gccgagaaaa aggacatagt tggtctgcag  1020
gaacaggttt ttgtaagaaa agttgattgag cttcacgaca agtacttgac ttacgtgaat  1080
gattgtttcc aaaaccacac acttttttcac aaggctctca aggaagcttt tgaagtcttt  1140
tgcaataagg gtgttgctgg aagttctagt gcagaattac ttgctacctt ttgtgataac  1200
atccttaaga aggtgggag cgagaagttg agtgatgaag caattgagga gacacttgag  1260
aaggtcgtga agttgctggc atacatctgc gacaaagatc tgtttgctga attctataga  1320
aaaaacttg cccgaaggct tctctttgac aagagtgcca acgatgacca tgagagaagt  1380
atattgacca aattgaagca acaatgtggt ggccagttca cctctaagat ggagggatg  1440
gtcactgatt tgactttggc aagggagaac caaactagtt tcgaggagta tctgagcaat  1500
aatccacaag ctagtcctgg aatcgacttg actgtcactg ttttgactac tgactttga   1560
ccaagctaca agtcttttga cctcaacctg ccggcagaga tggtaaagtg tgttgaagtt  1620
ttcagagagt tctatcaaac aaaaacaaag catagaaaac ttacatggat ttactcattg  1680
ggtacctgta acatcagcgg aaatttgaa ccgaaacga tggagctgat tgtaacaact  1740
tatcaggctt ctgccctgct gctattcaat tcctacagata gattaagtta ttccgagtcc  1800
atgacacaat taaattgag tgacgatgat gttgttagac tgctccactc attgctcatgt  1860
gccaagtata aaattcttaa taaggagccg aacacgaaaa ccatctctcc gaatgatcat  1920
tttgagttca atgcaaaatt ctccgacaaa atgaggagaa taaagatccc tcttccgcct  1980
gtggatgaga aaaagaaagt cattgaagat gttgacaagg atcgaaggta tgctattgat  2040
gcctcaatcg tgcgtatcat gaagagtcgg aaagttctgg gtcatcagca gctagtgatg  2100
gagtgcgtcg agcaattggg tcgtatgttc aagagagaga caaagacaac ccccacttgt  2160
ttaggtactt ggcttgatct tgccttaacc atgggcaaga gtggtggtct ggtgctattt  2220
gatatagcat ga                                                       2232

SEQ ID NO: 4          moltype = AA  length = 743
FEATURE               Location/Qualifiers
REGION                1..743
                      note = Mutant cullin1 protein
source                1..743
                      mol_type = protein
                      organism = Citrullus lanatus
SEQUENCE: 4
MTMGERKTID LEQGWEFMQK GITKLKNILE GLPEPQFSSE DYMMLYTTIY NMCTQKPPHD    60
YSQQLYDKYR ESFEEYITSM VLPSLREKHD EFMLRELVKR WTNHKVMVRW LSRFFHYLDR   120
YFIARRSLPP LNEVGLTCFR ELVYKELNSK VRDAVISLID QEREGEQIDR ALLKNVLDIF   180
VEIGMGQMDY YENDFEAAML KDTAAYYSRK ASNWILEDSC PDYMLKAEEC LKREKDRVSH   240
YLHSSSEPKL LEKVQHELLS VYATQLLEKE HSGCHALLRD DKVEDLSRMF RLFSKIPKGL   300
DPVSNIFKQH VTAEGTALVK QAEDAASNKK AEKKDIVGLQ EQVFVRKVIE LHDKYLAYVN   360
DCFQNHTLFH KALKEAFEVF CNKGVAGSSS AELLATFCDN ILKKGGSEKL SDEAIEETLE   420
KVVKLLAYIC DKDLFAEFYR KKLARRLLFD KSANDDHERS ILTKLKQQCG GQFTSKMEGM   480
VTDLTLAREN QTSFEEYLSN NPQASPGIDL TVTVLTTDFW PSYKSFDLNL PAEMVKCVEV   540
FREFYQTKTK HRKLTWIYSL GTCNISGKFE PKTMELIVTT YQASALLLFN SSDRLSYSEI   600
MTQLNLSDDD VVRLLHSLSC AKYKILNKEP NTKTISPNDH FEFNAKFSDK MRRIKIPLPP   660
VDEKKKVIED VDKDRRYAID ASIVRIMKSR KVLGHQQLVM ECVEQLGRMF KRETKTTPTC   720
LGTWLDLALT MGKSGGLVLF DIA                                           743

SEQ ID NO: 5          moltype = DNA  length = 63
FEATURE               Location/Qualifiers
misc_feature          1..63
                      note = Marker Wildtype A
source                1..63
                      mol_type = genomic DNA
                      organism = Citrullus lanatus
SEQUENCE: 5
gactgtcact gttttgacta ctggcttttg gccaagctac aagtcttttg acctcaacct    60
gcc                                                                  63

SEQ ID NO: 6          moltype = DNA  length = 63
FEATURE               Location/Qualifiers
misc_feature          1..63
                      note = Marker mutant B
source                1..63
                      mol_type = genomic DNA
                      organism = Citrullus lanatus
```

```
SEQUENCE: 6
gactgtcact gttttgacta ctgacttttg gccaagctac aagtcttttg acctcaacct    60
gcc                                                                  63
```

MUTANT GENE CONFERRING A COMPACT GROWTH PHENOTYPE IN WATERMELON

RELATED APPLICATIONS AND INCORPORATION BY REFERENCE

This application is a continuation-in-part application of international patent application Serial No. PCT/EP2021/070157 filed 19 Jul. 2021, which published as PCT Publication No. WO 2022/018030 on 27 Jan. 2022, which claims benefit of international patent application Serial No. PCT/EP2020/070588 filed 21 Jul. 2020.

The foregoing applications, and all documents cited therein or during their prosecution ("appin cited documents") and all documents cited or referenced in the appin cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

SEQUENCE STATEMENT

The instant application contains a Sequence Listing which has been submitted electronically and is hereby incorporated by reference in its entirety. Said XML copy, was created Jan. 12, 2023, is named Y7954-00563SL.xml and is 14,598 bytes in size.

FIELD OF THE INVENTION

The present invention relates to a mutant plant gene in watermelon that leads to a compact phenotype, a watermelon plant which can comprise the mutant gene, and to methods for identifying, and producing said watermelon plant. Furthermore, the invention relates to markers and the use thereof for identifying watermelon plants which can comprise the modified gene.

BACKGROUND OF THE INVENTION

Watermelon belongs to the genus *Citrullus* Schrad. ex Ecki. & Zeyh., which genus is part of the Cucurbit family (Cucurbitaceae). The modern cultivated watermelon is known as *Citrullus lanatus* subsp. *lanatus* (Thunb.) Matsum & Nakai, although in literature sometimes the old indication *Citrullus vulgaris* Schrad. is still used. Watermelon plants are grown in large parts of the world, the most important watermelon producing areas are the southern part of the USA, the Middle East, Africa, India, Japan and southern Europe.

Watermelon plants develop several vines and therefore require a large amount of space for optimum growth and fruit development. Watermelons are generally sown in rows, applying a plant spacing of 0.6 m to 1.2 m of plants within rows and a row spacing of 1.8 to 2.4 m between rows. This wide spacing requires a large field size. Use of irrigation and mulching can lead to the use of more dense plant populations and therefore the reduction of space needed for cultivation. However, denser planting might also lead to fewer fruits per plant.

Plant breeders are continuously looking for more efficient ways to cultivate plants. One way to improve efficiency is to reduce the space needed for cultivation. This is certainly important in watermelon cultivation, as explained above. A more efficient cultivation can be achieved in crops if the plants have a compact growth phenotype.

Such a compact growth phenotype is characterized by the plants showing shorter internodes and/or a smaller leaf area. Because of this compact growth phenotype, the plants can be planted in higher densities, thereby saving a lot of space. Additionally, a crop with a compact growth phenotype requires less pruning, which means that the amount of work is reduced.

Citation or identification of any document in this application is not an admission that such document is available as prior art to the present invention.

SUMMARY OF THE INVENTION

It is a goal of the present invention to provide a watermelon plant that enables efficient cultivation.

A few years ago, it was found that a specific mutation in the skp1 binding domain of the Cullin1 gene lead to compact growth phenotype in cucumber plants (*Cucumis sativus*).

In the research leading up to the present invention, it was surprisingly found that another, different mutation in the Cullin1 gene in watermelon, created by EMS mutagenesis, leads to a compact growth phenotype in a watermelon plant (*Citrullus lanatus*). The mutation of the present invention is located in a different region of the Cullin1 gene in comparison to the previously found mutation in the Cullin1 gene in cucumber (*Cucumis sativus*).

The present invention relates to a mutant Cullin1 gene encoding a protein conferring a compact growth phenotype in a watermelon (*Citrullus lanatus*) plant, in which the protein is expressed, characterized in that the gene can comprise a nucleotide sequence selected from a) a nucleotide sequence which encodes a protein which can comprise SEQ ID NO: 4; b) a nucleotide sequence which can comprise SEQ ID NO: 3; c) a nucleotide sequence encoding a protein derived by substitution, deletion and/or addition of one or more amino acids of the protein which can comprise SEQ ID NO: 4; or d) a nucleotide sequence according to c) wherein the protein can comprise a aspartic acid (D) on position 518 of SEQ ID NO: 4.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

A watermelon plant that can comprise the mutant Cullin1 gene is in particular suitable for efficient cultivation. Such a plant shows a shorter internode length and/or a smaller leaf area and may also display other characteristics that lead to a compact growth phenotype.

Cullin proteins are a family of proteins present in all eukaryotes, not only plants. The Cullin proteins combine with RING proteins to form so-called Cullin-RING ubiquitine ligases (CRLs). In general, Cullin proteins play an important role in protein ubiquitination and protein degradation.

Ubiquitination (also known as ubiquitylation) is an enzymatic, post-translational mutation process in which an ubiquitin protein is ligated to a substrate protein.

The Cullin1 protein, which is a member of the Cullin protein family, is one out of the four subunits that make up the so-called SCF complex. The abbreviation SCF stands for SKP1-CUL1-F-box protein E3 ubiquitin ligase complex, which mediates the ubiquitination of proteins involved in cell cycle progression, signal transduction and transcription. In the SCF complex, the Cullin1 protein serves as a rigid scaffold that organizes the SKP1-F-box protein and RBX1 subunits. It may contribute to catalysis through positioning of the substrate and the ubiquitin-conjugating enzyme.

The present invention relates to a mutant Cullin1 gene encoding a protein conferring a compact growth phenotype in a watermelon (Citrullus lanatus) plant, in which the protein is expressed, characterized in that the gene can comprise a nucleotide sequence selected from a) a nucleotide sequence which encodes a protein which can comprise SEQ ID NO: 4; b) a nucleotide sequence which can comprise SEQ ID NO: 3; c) a nucleotide sequence encoding a protein derived by substitution, deletion and/or addition of one or more amino acids of the protein which can comprise SEQ ID NO: 4; or d) a nucleotide sequence according to c) wherein the protein can comprise a aspartic acid (D) on position 518 of SEQ ID NO: 4.

An induced SNP was identified in the Cullin1 gene of watermelon plants showing the compact growth phenotype. The mutation in the Cullin1 gene of the invention can comprise a substitution of the nucleotide on position 1553 in the wild type Cullin1 gene nucleotide sequence of SEQ ID NO: 1.

The SNP at position 1553 in wild type Cullin1 gene nucleotide sequence SEQ ID NO: 1 constitutes a guanine (G) in the wild type of the Cullin1 gene and an adenine (A) in the mutant Cullin1 gene.

The mutation in the wild type Cullin1 gene nucleotide sequence SEQ ID NO: 1 leads to a change in the wild type amino acid sequence of SEQ ID NO: 2, shown in FIGS. 1A-1F. The mutation on position 1553 of nucleotide sequence SEQ ID NO: 1 leads to a substitution of amino acid Glycine (G), on position 518 of the wild type amino acid sequence SEQ ID NO: 2, to amino acid Aspartic acid (D), as presented in the mutant amino acid sequence SEQ ID NO: 4, shown in FIGS. 1A-1F. The SNP is located in a region within the Cullin1 gene, which on one side isflanked by the region involved in encoding the part of the Cullin1 protein binding the Skp1 protein unit and on the other side by the region involved encoding for the part of the Cullin1 protein binding the Rbx1 protein unit as part of the SCF complex described before. In contrast with the previously found Cullin1 gene mutation in cucumber, the Cullin1 gene mutation of the current invention in watermelon is thus not located in the region of the Cullin1 protein that binds to the Skp1 protein.

The Cullin1 gene is a gene encoding the Cullin1 protein. The Cullin1 gene is a gene which can comprise a wildtype coding sequence represented by SEQ ID NO: 1, or a gene encoding the Cullin1 wildtype protein which can comprise SEQ ID NO: 2. The mutant Cullin1 gene as used herein, refers to a mutant nucleotide sequence of the Cullin1 gene as compared to the wild type nucleotide sequence of the Cullin1 gene. The mutation in this mutant, includes but is not limited to a nucleotide substitution.

The wild type nucleotide sequence of the Cullin1 gene is shown by SEQ ID NO: 1, the mutant nucleotide sequence of the Cullin1 gene is shown in SEQ ID NO: 3, see FIGS. 1A-1F.

The invention also provides a protein, conferring the compact growth phenotype in a watermelon (Citrullus lanatus) plant, in which the protein is expressed and which protein is encoded by the mutant Cullin1 gene as described.

The invention further relates to a watermelon plant, or a part thereof, which can comprise the mutant Cullin1 gene as described in the present application.

A plant of the invention is a watermelon plant, Citrullus lanatus, most preferably an agronomically elite Citrullus lanatus plant.

In this application all watermelon plants referred to are diploid. If a plant referred to in this application is not diploid it will be indicated that it is triploid or tetraploid.

In the context of this invention, an agronomically elite plant is a plant having a genotype that, as a result of directed crossing and selection by human interventions, can comprise an accumulation of distinguishable and desirable agronomic traits which allow a producer to harvest a product of commercial significance.

The plant of the invention may be a plant of an inbred line, a hybrid, a doubled haploid, or a plant of a segregating population. As used herein, a plant of an inbred line is a plant of a population of plants that is the results of three or more rounds of selfing, or backcrossing; or which plant is double haploid. An inbred line may for example be a parent line used for the production of a commercial hybrid. The plant of the invention may be a diploid, a tetraploid or a triploid watermelon plant. A triploid watermelon can be produced by treating a diploid watermelon line with colchicine to obtain a tetraploid watermelon plant which successively can be crossed with a diploid watermelon plant to generate triploid watermelon plants.

The plant of the invention, a watermelon (*Citrullus lanatus*) plant, preferably can comprise the mutant Cullin1 gene homozygously. When the plant can comprise the mutant Cullin1 gene homozygously, it shows the compact growth phenotype. The plant heterozygous for the mutant Cullin1 gene may be crossed or selfed to produce a plant that can comprise the mutant Cullin1 gene homozygously and shows the compact growth phenotype. The plant heterozygous for the mutant Cullin 1 gene does show the compact growth phenotype, but the trait is not as strongly expressed as in the plant homozygous for the Cullin1 gene.

A plant which can comprise the mutant Cullin1 gene shows a compact growth phenotype, i.e. can comprise a shorter internode length and/or a smaller leaf area, compared to an isogenic plant of the same species not comprising the mutant Cullin1 gene.

The term "compact growth phenotype" as used herein refers to a phenotype of a shorter internode length and/or a smaller leaf area. Plants which can comprise the mutant Cullin1 gene, show shorter internodes and/or a smaller leaf area.

The term "smaller leaf area" as used herein is the average leaf area that displays a reduction of, in order of increased preference, at least 10%, at least 15%, at least 20%, at least 25%, at least 30%, at least 31%, at least 32%, at least 33%, at least 34%, at least 35%, at least 36%, at least 37%, at least 38%, at least 39%, at least 40%, at least 45%, at least 50%, at least 51%, at least 52%, at least 53%, at least 54%, at least 55%, at least 56%, at least 57%, at least 58% as compared to the average leaf area of a watermelon plant without the mutation as a result of the homozygous or heterozygous presence of the mutant gene of the invention. To investigate the influence of the gene of the invention on the smaller leaf area, a skilled person would have to compare plants having the mutant gene of the invention homozygously or heterozygously with plants that are isogenic to first mentioned plants but do not have the mutant gene of the invention.

With the term "leaf" is meant the part of the plant consisting of the petiole and leaf blade. With the term "leaf area" is meant the surface consisting of the leaf blade.

The term "shorter internodes" or "shorter internode length" as used herein is the average internode length that shows a reduction of, in order of increased preference, at least at least 4%, 5%, 10%, at least 15%, at least 20%, at least 25%, at least 30%, at least 35%, at least 40%, at least 41%, at least 42%, as compared to the average internode length of a watermelon plant without the mutation as a result of the homozygous or heterozygous presence of the mutant gene of the invention.

To investigate the influence of the mutant gene of the invention on the shorter internode length, a skilled person would have to compare plants having the mutant gene of the invention homozygously or heterozygously with plants that are isogenic to first mentioned plants but wherein the gene does not have the mutation of the invention. The internode length can be assessed by the length of the main stem divided by the number of internodes in a plant. The leaf area is roughly estimated by multiplying the length and the width from all but the first leafs present on a plant and computing the average leaf area per plant.

The invention further relates to a plant seed which can comprise the mutant Cullin1 gene of the invention, wherein the plant that can be grown from the seed shows a compact growth phenotype.

The invention also relates to a method for seed production which can comprise growing plants from seeds of the invention, allowing the plants to produce seeds by allowing pollination to occur, and harvesting those seeds. Production of the seeds is suitably done by crossing or selfing. Seeds produced in that manner result in plants showing a compact growth phenotype, if both parents comprise the mutant gene of the invention homozygously.

Another aspect of the invention relates to propagation material capable of developing into a plant which can comprise the mutant Cullin1 gene of the invention, and/or propagation material derived from a plant which can comprise the mutant Cullin1 gene of the invention, wherein the plant shows a compact growth phenotype, compared to an isogenic plant of the same species not comprising the mutant Cullin1 gene, wherein the propagation material can comprise the mutant Cullin1 gene of the invention and wherein the propagation material is selected from the group consisting of microspores, pollen, ovaries, ovules, embryos, embryo sacs, egg cells, cuttings, roots, hypocotyls, cotyledons, stems, leaves, flowers, anthers, seeds, meristematic cells, protoplasts and cells, or tissue culture thereof.

The invention thus further relates to parts of a plant of the invention that are suitable for sexual reproduction. Such parts are for example selected from the group consisting of a microspore, pollen, an ovary, an ovule, an embryo sac, and an egg cell. In addition, the invention relates to parts of a claimed plant that are suitable for vegetative reproduction, which are in particular a cutting, a root, a stem, a cell, a protoplast. The parts of the plants as mentioned above are considered propagation material. The plant that is produced from the propagation material can comprise the mutant Cullin1 gene that confers a compact growth phenotype.

The invention also relates to a cell of a plant of the invention. Said cell may be a cell in isolated condition or as a part of a complete plant or plant parts thereof. A cell of the plant of the invention can comprise the genetic information, which in the current invention is the presence of the mutant Cullin1 gene as defined herein, that when homozygously present in the genome of a cell, leads to a compact growth phenotype in a plant of the invention. A cell of the invention may also be a cell that can regenerate into a new plant of the invention.

According to a further aspect thereof, the invention provides a tissue culture of a plant carrying the mutant Cullin1 gene of the invention, which is also propagation material. The tissue culture can comprise regenerable cells. Such tissue culture can be selected or derived from any part of the plant, in particular from leaves, pollen, embryos, cotyledon, hypocotyls, meristematic cells, roots, root tips, anthers, flowers, seeds, and stems. The tissue culture can be regenerated into a plant carrying the mutant Cullin1 gene of the invention, which regenerated plant expresses the trait of the invention and is also part of the invention.

The use of a watermelon plant as a crop, which watermelon plant can comprise the mutant Cullin1 gene of the invention, preferably homozygously, is considered as part of the invention.

Furthermore, the use of a watermelon plant which can comprise the mutant Cullin1 gene of the invention, preferably homozygously, as a source of seed or propagation material, is considered as part of the invention.

The invention also relates to the use of a watermelon fruit, which can comprise the mutant Cullin1 gene of the invention, preferably homozygously, for consumption.

A food product or processed food product, which can comprise the watermelon fruit, or a part thereof, that has the mutant Cullin1 gene of the invention, is also considered part of the invention. The food product may have undergone one or more processing steps. Such a processing step might consist of but is not limited to any of the following treatments or any combination thereof: peeling, cutting, washing, juicing, cooking, cooling. The processed form that may be obtained is also part of the invention.

The invention also provides a marker for identifying a watermelon plant which can comprise a mutant Cullin1 gene, wherein the marker detects a mutant nucleotide on position 1553 as compared to the wild type Cullin1 gene nucleotide sequence of SEQ ID NO: 1. Preferably the marker of the invention detects an Adenine (A) on position 1553 of SEQ ID NO: 1 as shown in SEQ ID NO: 3.

Figure 1A:
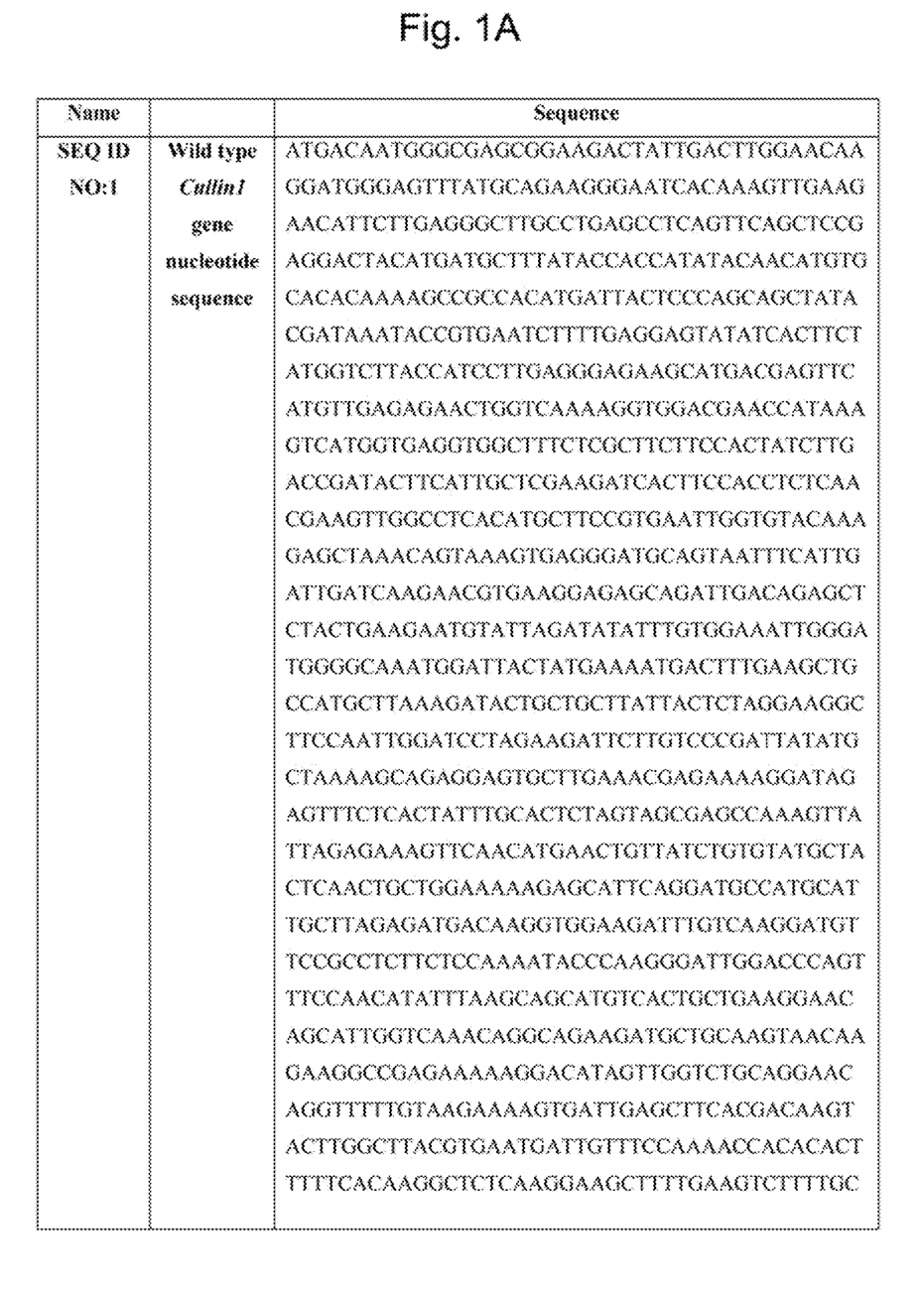
FIGS. 1A-1F. Nucleotide sequence and amino acid sequence of the wild type Cullin1 gene and Cullin1 protein and nucleotide sequence and amino acid sequence of the mutant Cullin1 gene and the mutant Cullin1 protein of the invention of a watermelon plant.
Figure 1B:
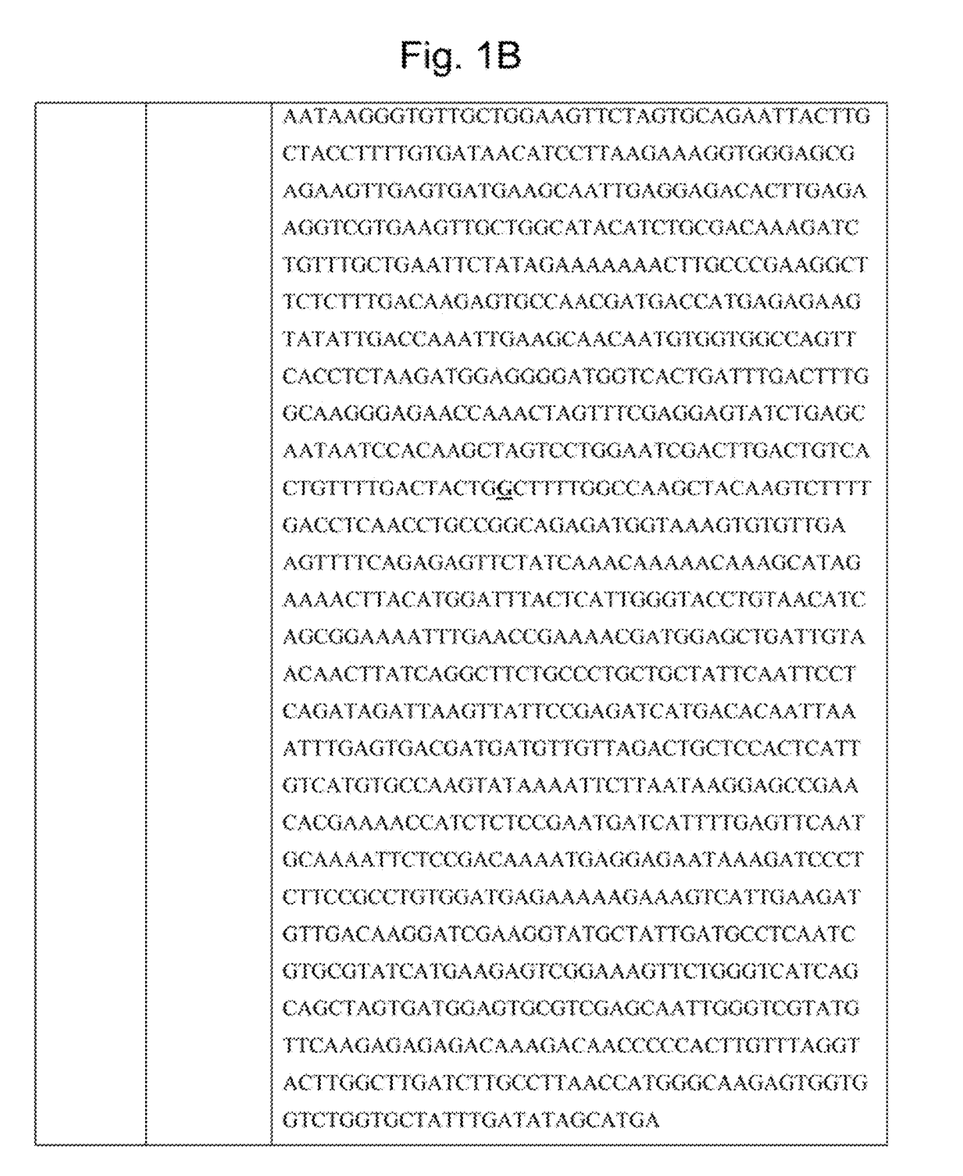
Figure 1C:
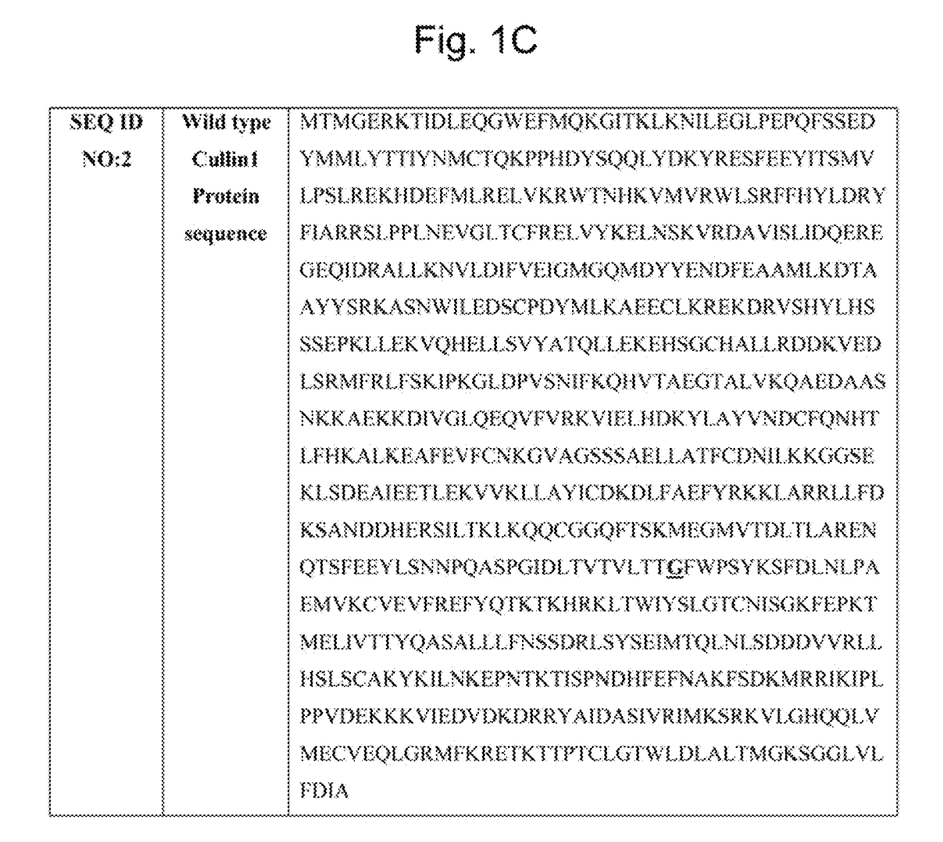
Figure 1D:
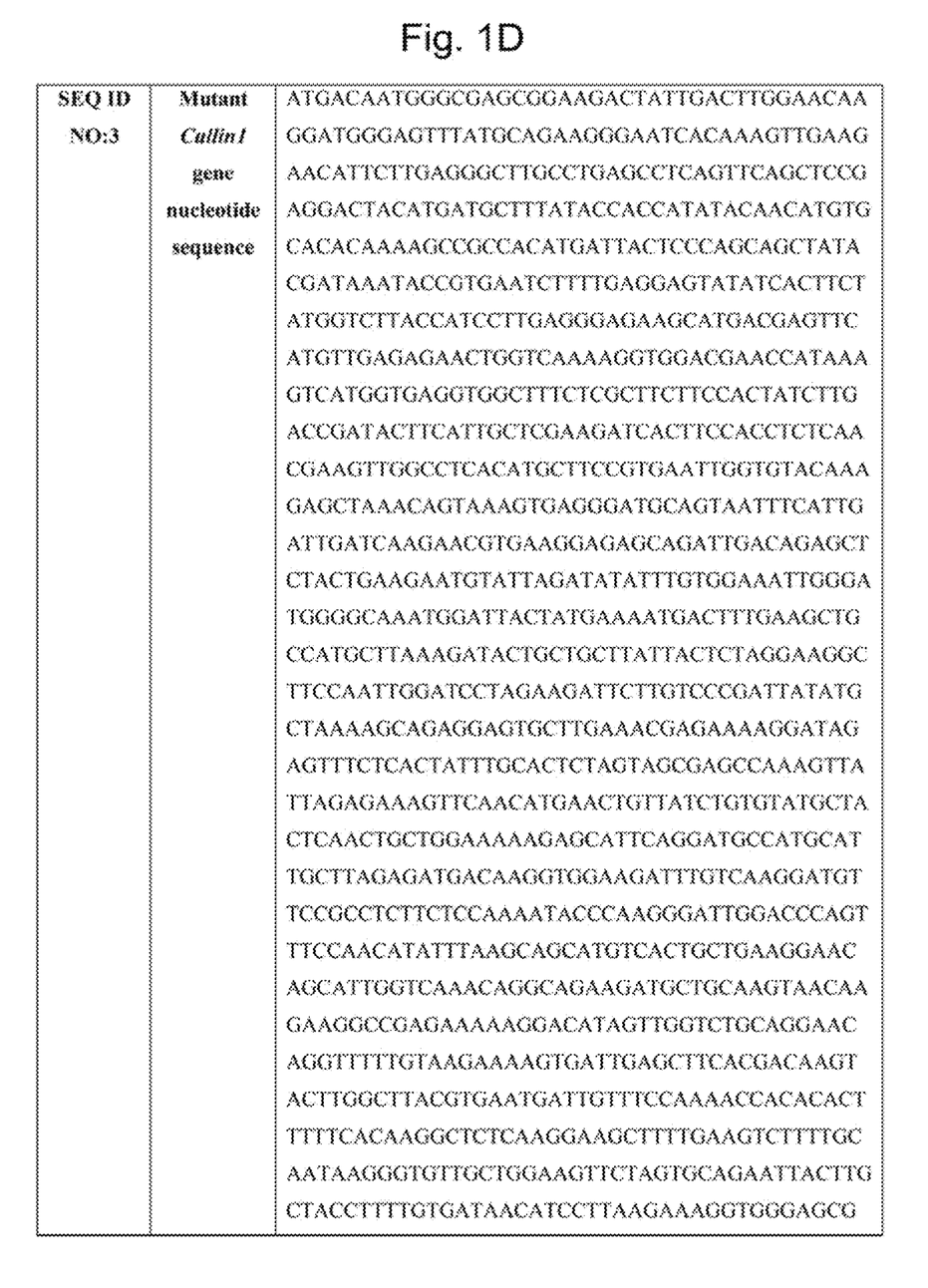
Figure 1E:
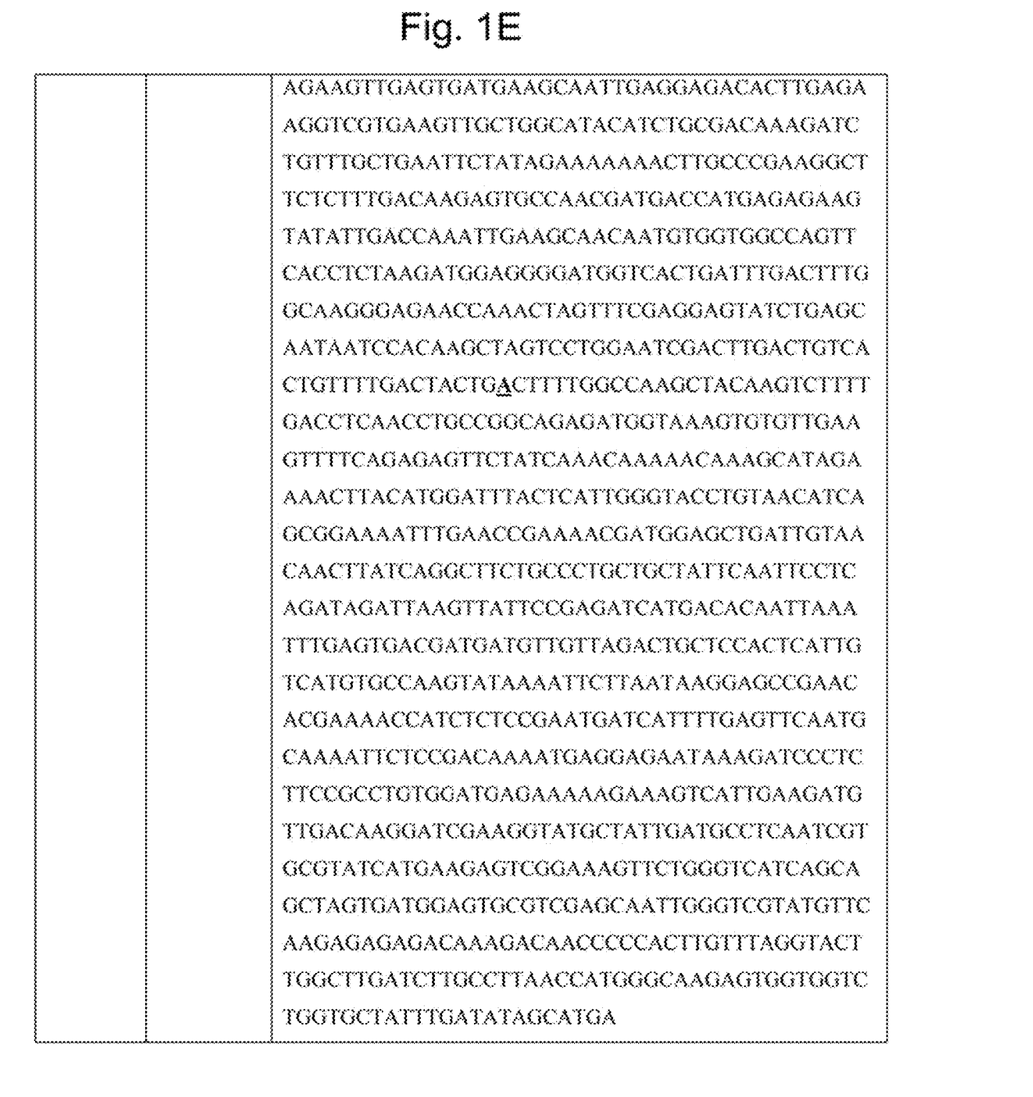
Figure 1F:
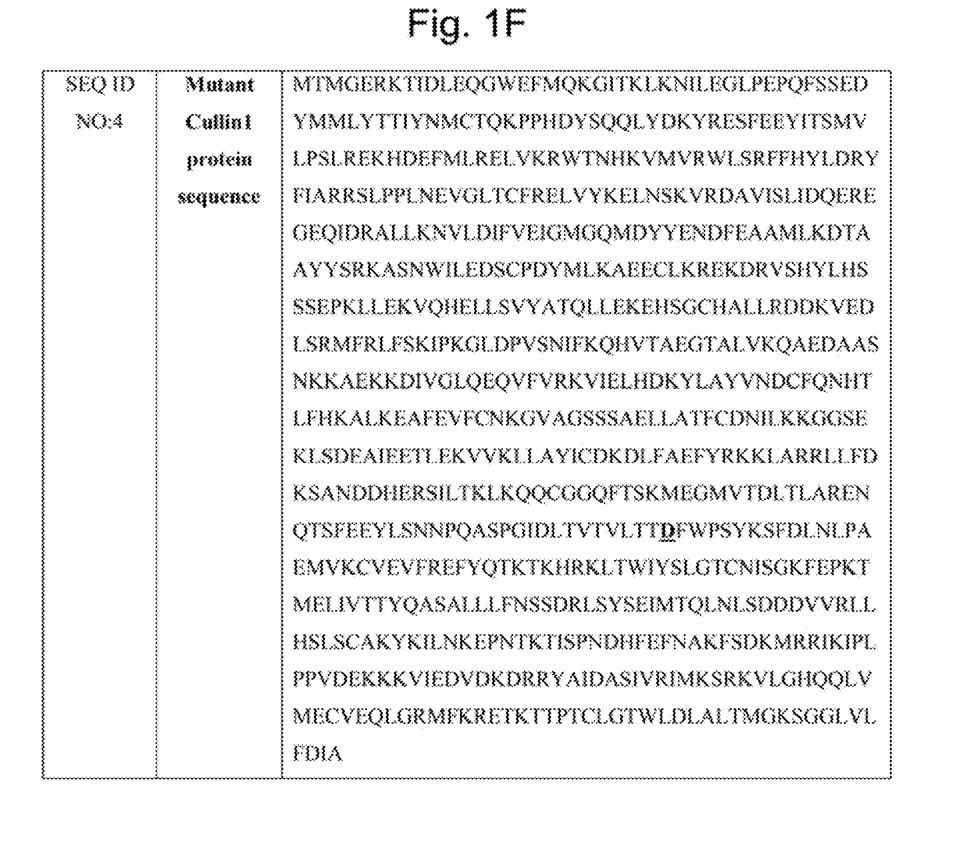
Figure 2:
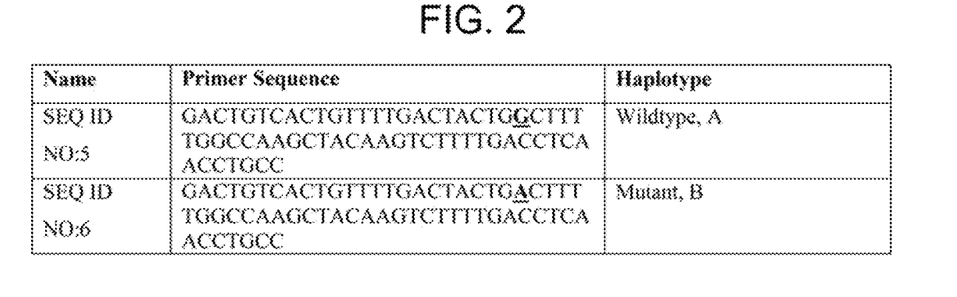
FIG. 2. Nucleotide sequences of amplicons of the wild type Cullin1 and the mutant Cullin1 gene of the invention, obtained with a KASP assay, that can be used as markers.

The marker can comprise a part of SEQ ID NO: 3, in particular SEQ ID NO: 6. The marker sequences, shown in FIG. 2, can be used to identify a watermelon plant that can comprise the mutant Cullin1 gene of the invention. The marker sequences can be obtained using a KASP assay, but there are many other genetic assay types and marker methods available that can be used. A person skilled in the art knows how to use the sequence information presented in this application to develop other markers for identifying a watermelon plant that can comprise the mutant Cullin1 gene of the invention.

The use of a marker for identifying a watermelon plant that can comprise the mutant Cullin1 gene as described herein, and in particular for identifying a plant that shows the compact growth phenotype, is also part of this invention.

The invention further relates to a method for producing a plant that shows the compact growth phenotype by introducing the mutant Cullin1 gene into the genome of a plant. Introducing a (mutant) gene can be done by introgression, chemical or physical induced mutagenesis, and so-called gene editing methods.

Mutations of the Cullin1 gene can be introduced randomly by means of one or more chemical compounds, such as ethyl methane sulphonate (EMS), nitrosomethylurea, hydroxylamine, proflavine, N-methly-N-nitrosoguanidine, N-ethyl-Nnitrosourea, N-methyl-N-nitro-nitrosoguanidine, diethyl sulphate, ethylene imine, sodium azide, formaline, urethane, phenol and ethylene oxide, and/or by physical means, such as UV-irradiation, fast neutron exposure, X-rays, gamma irradiation, and/or by insertion of genetic elements, such as transposons, T-DNA, retroviral elements.

Mutations of the Cullin1 gene can also be introduced via more specific, targeted methods like homologous recombination, oligonucleotide-based mutation introduction, zinc-finger nucleases (ZFN), transcription activator-like effector nucleases (TALENs) or Clustered Regularly Interspaced Short Palindromic Repeat (CRISPR) systems.

Additionally, it should be checked whether the mutations found in the nucleotides lead to changes in the amino acids encoded. The skilled person is familiar with TILLING to identify mutations in specific genes (McCallum et. al. (2000) Nature Biotechnology, 18: 455-457), and with techniques for identifying nucleotide changes such as DNA sequencing, amongst others. Plants with a mutant Cullin1 gene are homozygous or made homozygous by selfing, crossing, or the use of doubled haploid techniques which are familiar to the skilled person.

Watermelon plants identified and selected on the basis of the mutation in a Cullin1 gene can then be tested for expressing the compact growth phenotype. A plant that is produced, identified and selected in this way can thus be confirmed to have its compact growth phenotype as a result from the mutation in the Cullin1 gene.

The invention also covers a method for selecting a watermelon plant showing the compact growth phenotype, which can comprise a) identifying the presence of the mutant Cullin1 gene of the invention, b) selecting a watermelon plant that can comprise said mutant gene; c) optionally testing the selected plant for showing the compact growth phenotype, and d) selecting the plant if it shows the compact growth phenotype as a compact growth watermelon plant.

The identification of the presence of a mutant Cullin1 gene is suitably performed by using a marker of the invention, as defined herein.

Also included in this invention is a method for producing a watermelon plant that can comprise the mutant Cullin1 gene of the invention, said method which can comprise: a) crossing a first parent watermelon plant which can comprise the mutant Cullin1 gene of the invention, with a second parent watermelon plant, to obtain an F1 population, b) optionally performing one or more rounds of selfing and/or crossing with a plant from said F1 population to obtain a further generation population, c) selecting a plant that can comprise the mutant Cullin1 gene. The second parent plant, as described in step a) of the method for producing a watermelon plant that can comprise the mutant Cullin1 gene can also comprise the mutant Cullin1 gene of the invention.

The method for producing a watermelon plant that can comprise the mutant Cullin1 gene can further also comprise the steps of d) testing the selected plant for showing the compact growth phenotype; e) selecting the plant if it shows a compact growth (phenotype).

The invention also relates to a method for selecting a watermelon plant that can comprise the mutant Cullin1 gene of the invention, said method which can comprise; a) assaying nucleic acids of a watermelon plant for the presence of the mutant Cullin1 gene; b) identifying a plant that can comprise the mutant Cullin1 gene, and selecting said plant.

The method for selecting a watermelon plant that can comprise the mutant Cullin1 gene of the invention can further comprise c) testing the selected plant for the compact growth phenotype, d) selecting the plant if it shows the compact growth phenotype.

Assaying nucleic acids of a plant can comprise isolating acids from a plant and analysing the isolated sample with a chosen method to detect the mutant gene or mutation in the gene of interest. This method can be chosen from a group of methods that is well known in the art such as PCR, RT-PCR, antibody-assays, sequencing assays, genotyping assays, or any combination of these methods.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1: Creation of a Mutant Watermelon Plant with a Compact Growth Phenotype by Means of EMS Watermelon (*Citrullus lanatus*) seeds from an internal diploid watermelon line were treated by a mutagenic EMS treatment. A number of approximately 8500 seeds were imbibed under agitation (60 rpm) and using 1 ml/seed (150 ml per dose) with a solution of 1% (w/v) EMS during 16 hours at temperature of 30° C. After the treatment, the seeds were washed for 4 hours changing the water every 15 min during the first hour (150 ml per wash) and every 30 min the remaining 3 hours.

The treated seeds were germinated on paper in a small plastic container and the resulting M1 plants, approximately 6100 plants, were transplanted, grown and self-pollinated in a greenhouse to produce seeds. The resulting pool of seeds was used as starting material M2 to identify the individual plants that show architectural mutations.

Figure 3:
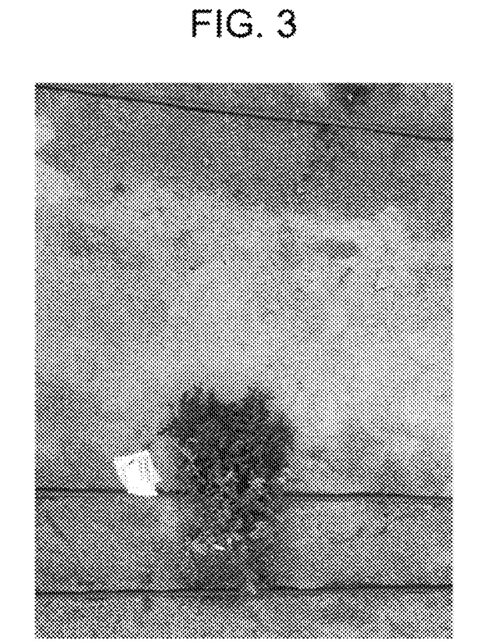
FIG. 3. A watermelon plant comprising the mutant Cullin1 gene homozygously.
Figure 4:
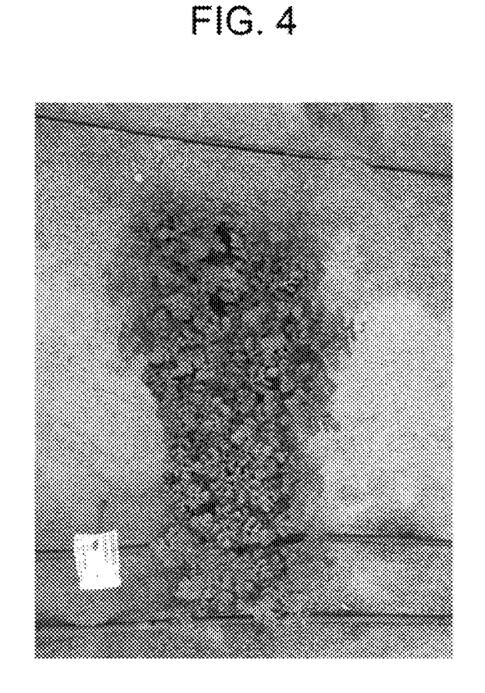
FIG. 4. A watermelon plant comprising the mutant Cullin1 gene heterozygously.
Figure 5:
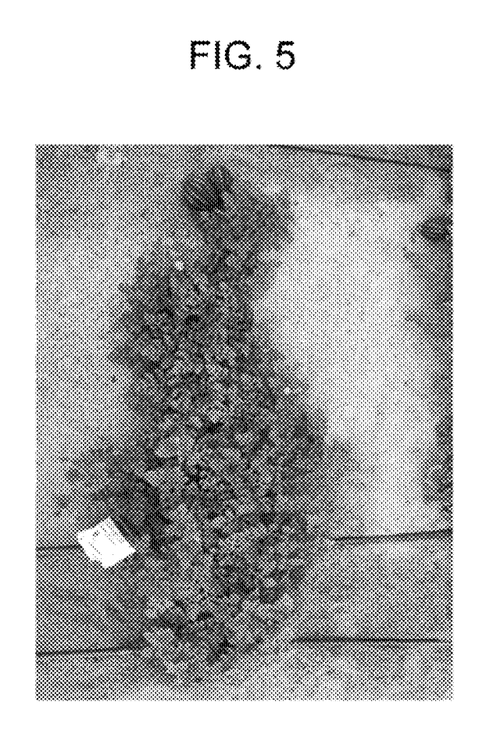
FIG. 5. A watermelon plant comprising the wild type Cullin1 gene homozygously.

Example 2: Identification of the Underlying Mutation Causing the Compact Growth Phenotype in the EMS Watermelon Mutant The watermelon mutants which were created as described in Example 1, were grown in a greenhouse in order to produce lines by self-fertilisation. Watermelon plant lines were sown and grown in the field and screened phenotypically Watermelon plants belonging to one specific mutant watermelon line, EMS mutant 126, showed a compact growth phenotype. FIG. 3 shows a watermelon plant homozygous for the mutant Cullin1 gene and FIG. 4 shows a watermelon plant heterozygous for the mutant Cullin1 gene. FIG. 5 shows a watermelon plant homozygous for the wild type Cullin1 gene. Mutant plants were screened by means of TILLING (McCallum et. al., 2000 Nature Biotechnology, 18: 455-457) to identify mutations in several plant architecture genes among which the Cullin1 gene. By using TILLING, and subsequently sequencing, it was found that the mutant watermelon line EMS mutant 126, comprised a SNP mutation in the nucleotide sequence of chromosome 6.

DNA sequencing and using a BLAST software program revealed that the mutation is located in the Cullin1 gene and consists of a mutation of guanine (G) to adenine (A) on position 1553 of the wildtype nucleotide sequence SEQ ID NO: 1, leading to an amino acid change of glycine (G) to aspartic acid (D) on position 518 of the wildtype amino acid sequence SEQ ID NO: 2.

Example 3: Validation of the Effect the Mutation in the Cullin1 Gene on Internode Length and Plant Leaf Area

*Citrullus lanatus* plants from the fourth generation after the mutation treatment as is described in Example 1, were analysed phenotypically and genetically. See Table 1 for the phenotypic and genetic data.

Plants were measured 11 weeks after sowing. For estimating the leaf area, the second leaf and all following leafs present in a plant were measured. The width and the length of each leaf were measured and multiplied with each other to obtain a rough estimate of the leaf area. The average leaf area per plant was computed.

The plants were assessed for the presence of the mutated Cullin1 gene by means of a KASP assay. KASP, short for kompetitive allele specific PCR, is based on allele-specific oligo extension. A single-nucleotide polymorphism (SNP) occurs when a single nucleotide in a DNA sequence differs between samples. ars shown in FIG. 2. A person skilled in the art knows how to perform a KASP assay to identify plants. The haplotype scores (A, B and H) obtained by the KASP assay are shown in Table 1. The score A means that the plant comprises the wildtype Cullin1 gene homozygously, score B means that the plant comprises the mutant Cullin1 gene homozygously, and the score H means that the plant comprises the mutant Cullin1 gene heterozygously.

Plants that are homozygous for the mutant Cullin1 gene (B), show an average internode length that is 58% of the average length of the plants that score homozygous for the wild type Cullin1 gene (A). These plants, homozygous for the mutant Cullin1 gene (B) show an average leaf area that is 42% of the average leaf area of the plants that are homozygous for the wild type Cullin1 gene (A).

FIGS. 3, 4, 5 show a watermelon plant that comprise the mutant Cullin1 gene. homozygously, a watermelon plant that comprises the mutant Cullin1 gene heterozygously, and a watermelon plant that comprises the wild type Cullin1 gene homozygously, respectively.

TABLE 1

| Individual plant | Haplotype Cullin1 gene | Internode length (H/I) | Leaf area (JxK) |
|---|---|---|---|
| 12 | B | 4.07 | 33.79 |
| 13 | B | 2.04 | 35.56 |
| 14 | B | 1.83 | 36.63 |
| 15 | B | 2.00 | 29.08 |
| 16 | B | 2.55 | 47.74 |
| 17 | B | 2.20 | 50.42 |
| 18 | B | 2.18 | 26.71 |
| 110 | B | 3.02 | 37.73 |
| 111 | B | 2.28 | 40.96 |
| 112 | B | 1.94 | 34.43 |
| 113 | B | 2.06 | 40.26 |
| 29 | B | 1.68 | 33.92 |
| 23 | H | 3.83 | 65.40 |
| 27 | H | 4.37 | 40.67 |
| 28 | H | 4.39 | 61.57 |
| 212 | H | 2.76 | 62.48 |
| 214 | A | 3.74 | 81.81 |
| 24 | A | 4.21 | 95.82 |
| Average | B | 2.32 | 37.27 |
| Average | H | 3.84 | 57.53 |
| Average | A | 3.98 | 88.81 |

The haplotype (absence/presence of the mutant Cullin1 gene), internode length and leaf area measurements of watermelon plants of the fourth generation of the mutation event and isogeniccontrol plants. Regarding the presence of the mutant Cullin1 gene of the invention, haplotype A means homozygous wildtype Cullin1 gene, haplotype B means homozygous mutant Cullin1 gene, haplotype H means heterozygous mutant Cullin1 gene. Haplotypes were scored using a KASP assay. The internode length is defined as the length of the main stem divided by the number of internodes. The leaf area is roughly estimated by multiplying the length and the width from all but the first leafs present on a plant and computing the average leaf area per plant.

Example 4: Creation of Triploid Mutant Cullin1 Watermelon Plants

Creation of triploid watermelon which can comprise the mutant Cullin1 gene of the invention in order to generate a triploid mutant Cullin1 gene hybrid, first an inbred diploid mutant Cullin1 gene male parent line and an inbred tetraploid mutant Cullin1 gene female parent line is generated. Generation of the inbred mutant Cullin1 gene male parent is done by selecting a diploid having the compact growth type as described, crossing said diploid with proprietary lines in several successive crosses and inbreeding this derived diploid mutant Cullin1 gene line for several generations.

Generation of the tetraploid female mutant Cullin1 gene inbred line is done by selecting a diploid watermelon which can comprise the compact growth type, crossing said diploid watermelon with proprietary lines for several successive crosses and selfing the derived line for more than nine generations to get a uniform (inbred) diploid mutant Cullin1 gene line. The generated inbred diploid mutant Cullin1 gene line is then treated with colchicine for chromosome doubling. After the colchicine treatment a tetraploid line is selected and the line is selfed for several generations to fix the mutant Cullin1 gene characteristics in the tetraploid line. In each generation of the tetraploid line the ploidy level is checked using flow cytometry. The thus obtained inbred watermelon tetraploid line is crossed with a diploid watermelon line to obtain seeds that are triploid and show the compact growth phenotype.

The invention is further described by the following numbered paragraphs:

1. A mutant Cullin1 gene encoding a protein conferring a compact growth phenotype in a watermelon (*Citrullus lanatus*) plant in which the protein is expressed, characterized in that the gene comprises a nucleotide sequence selected from
    a) a nucleotide sequence which encodes a protein comprising SEQ ID NO: 4;
    b) a nucleotide sequence comprising SEQ ID NO: 3;
    c) a nucleotide sequence encoding a protein derived by substitution, deletion and/or addition of one or more amino acids of the protein comprising SEQ ID NO: 4; or
    d) a nucleotide sequence according to c) wherein the protein comprises a aspartic acid (D) on position 518 of SEQ ID NO: 4, or on a position corresponding thereto.
2. A protein, conferring a compact growth phenotype in a watermelon plant in which the protein is expressed and which protein is encoded by the gene of paragraph 1.
3. A watermelon (*Citrullus lanatus*) plant, comprising the mutant Cullin1 gene of paragraph 1.
4. The plant of paragraph 3 comprising the mutant Cullin1 gene homozygously, wherein the plant shows the compact growth phenotype.
5. Part of a plant, of any of the paragraphs 3 and 4, which plant part comprises the mutant Cullin1 gene of paragraph 1.
6. A seed comprising the mutant Cullin1 gene of paragraph 1.
7. A tissue culture of a plant of paragraphs 3 or 4, which tissue culture comprises the mutant Cullin1 gene of paragraph 1.
8. A marker for identifying a watermelon plant comprising a mutant Cullin1 gene, wherein the marker detects a mutant nucleotide on position 1553 as compared to the wild type Cullin1 gene nucleotide sequence of SEQ ID NO: 1.
9. A marker of paragraph 8, wherein the marker detects an adenine (A) on position 1553 of SEQ ID NO: 3.
10. A marker of paragraph 9, comprising a part of SEQ ID NO: 3, in particular SEQ ID NO: 6.
11. Use of a marker of any of the paragraphs 8-10, for identifying a watermelon plant that comprises a mutant Cullin1 gene, and in particular for identifying a plant showing the compact growth phenotype.
12. A method for producing a plant that shows the compact growth phenotype by introducing the mutant Cullin1 gene of paragraph 1 into the genome of a plant.
13. A method for selecting a plant showing the compact growth phenotype, comprising
    a) identifying the presence of the mutant Cullin1 gene of paragraph 1,
    b) selecting a plant that comprises said mutant gene;
    c) optionally testing the selected plant for showing the compact growth phenotype, and
    d) selecting the plant if it shows the compact growth phenotype as a compact growth plant.
14. Method of paragraph 13, wherein the identification is performed by using a marker as defined in paragraphs 8 to 10.
15. A method for producing a plant that comprises the mutant Cullin1 gene of paragraph 1, said method comprising:
    a) crossing a first parent plant comprising the mutant Cullin1 gene, of paragraph 1, with a second parent plant, to obtain an F1 population,
    b) optionally performing one or more rounds of selfing and/or crossing with a plant from said F1 population to obtain a further generation population,
    c) selecting a plant that comprises the mutant Cullin1 gene.
16. Method of paragraph 15, wherein the second parent plant also comprises a mutant Cullin1 gene of paragraph 1.
17. The method of paragraph 15 and 16, further comprising the steps of:
    d) testing the selected plant for showing the compact growth phenotype;
    e) selecting the plant if it shows a compact growth (phenotype).
18. A method for selecting a plant that comprises the mutant Cullin1 gene of paragraph 1, said method comprising;
    a) assaying nucleic acids of a plant for the presence of the mutant Cullin1 gene of paragraph 1;
    b) identifying a plant that comprises the mutant Cullin1 gene, and selecting said plant.
19. The method of paragraph 18, further comprising;
    c) testing the selected plant for the compact growth phenotype,
    d) selecting the plant if it shows the compact growth phenotype.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A watermelon (*Citrullus lanatus*) plant comprising a mutant Cullin1 gene encoding a protein conferring a compact growth phenotype, wherein the mutant Cullin1 gene comprises:
 a) a nucleotide sequence which encodes a protein comprising SEQ ID NO: 4;
 b) a nucleotide sequence comprising SEQ ID NO: 3; or
 c) a nucleotide sequence encoding a protein comprising SEQ ID NO: 4 but having an aspartic acid (D) at position 518 of SEQ ID NO: 4.

2. The *Citrullus lanatus* plant of claim 1, wherein the gene comprises the nucleotide sequence which encodes the protein comprising SEQ ID NO: 4.

3. The plant of claim 1, wherein the mutant Cullin1 gene is homozygously present.

4. A part of the plant of claim 1 comprising the mutant Cullin1 gene.

5. A seed of, or from, or that produces the plant of claim 1 and comprises the mutant Cullin1 gene.

6. A tissue culture of the plant of claim 1, comprising the mutant Cullin1 gene.

7. A marker for identifying a watermelon (*Citrullus lanatus*) plant comprising a mutant Cullin1 gene, wherein the marker detects a mutant nucleotide at position 1553 as compared to the wild type Cullin1 gene nucleotide sequence of SEQ ID NO: 1.

8. The marker of claim 7, wherein the marker detects an adenine (A) at position 1553 of SEQ ID NO: 3.

9. The plant of claim 1, wherein the plant is an agronomically elite *Citrullus lanatus* plant.

10. The marker of claim 8, comprising SEQ ID NO: 6.

11. A method for identifying a *Citrullus lanatus* plant comprising a mutant Cullin1 gene comprising detecting the mutant Cullin1 gene with the marker of claim 7.

12. The method of claim 11, wherein the method further identifies a plant exhibiting a compact growth phenotype.

13. A method for producing a watermelon (*Citrullus lanatus*) plant exhibiting a compact growth phenotype comprising introducing a mutation in a Cullin1 gene having a sequence comprising SEQ ID NO: 1,
 wherein the mutant Cullin1 gene leads to a glycine (G) to aspartic acid (D) substitution at position 518 of SEQ ID NO: 2.

14. A method for selecting a watermelon (*Citrullus lanatus*) plant exhibiting a compact growth phenotype, comprising
 a) identifying by genetic analysis the presence of a mutant Cullin1 gene,
 b) selecting a plant that comprises said mutant Cullin1 gene;
 c) optionally further testing the selected plant for the compact growth phenotype, and
 d) optionally selecting the further tested plant that exhibits the compact growth phenotype as a compact growth plant,
 wherein the mutant Cullin1 gene comprises:
 i) a nucleotide sequence which encodes a protein comprising SEQ ID NO: 4;
 ii) a nucleotide sequence comprising SEQ ID NO: 3; or
 iii) a nucleotide sequence encoding a protein comprising SEQ ID NO: 4 but having an aspartic acid (D) at position 518 of SEQ ID NO: 4.

15. Propagation material from or suitable for producing the plant of claim 1, wherein the propagation material is suitable for sexual reproduction, and a microspore, pollen, ovary, ovule, embryo sac or an egg cell, or the propagation material is suitable for vegetative reproduction and comprises a cutting, root, stem cell, or a protoplast, or the propagation material is suitable for tissue culture of regenerable cells or protoplasts and comprises a leaf, pollen, embryo, cotyledon, hypocotyl, meristematic cell, root, root tip, anther, flower or a stem, and wherein the propagation material comprises the mutant Cullin1 gene.

16. A method for producing a watermelon (*Citrullus lanatus*) plant comprising a mutant Cullin1 gene comprising the steps of:
 a) crossing a first *Citrullus lanatus* parent plant with a second *Citrullus lanatus* parent plant, to obtain an F1 population,
 b) optionally performing one or more rounds of selfing and/or crossing with a F1 *Citrullus lanatus* plant to obtain a further generation population,
 c) selecting from the population resulting from the cross of step a) or from the further generation population of step b), a *Citrullus lanatus* plant that comprises the mutant Cullin1 gene;
 wherein said mutant Cullin1 gene encodes a protein conferring a compact growth phenotype, and comprises:
 i) a nucleotide sequence which encodes a protein comprising SEQ ID NO: 4;
 ii) a nucleotide sequence comprising SEQ ID NO: 3; or
 iii) a nucleotide sequence encoding a protein comprising SEQ ID NO: 4 but having an aspartic acid (D) at position 518 of SEQ ID NO: 4.

17. The method of claim 16, wherein the second *Citrullus lanatus* parent plant also comprises the mutant Cullin1 gene.

18. The method of claim 16, further comprising the steps of:
 d) further testing the selected plant for the compact growth phenotype; and
 e) selecting the further tested plant exhibiting the compact growth phenotype.

19. The plant of claim 1, wherein the mutant Cullin1 gene comprises the nucleotide sequence comprising SEQ ID NO: 3.

20. The method of claim 14, further comprising;
 c) testing the further selected plant for the compact growth phenotype,
 d) selecting the further tested plant exhibiting the compact growth phenotype.

21. The plant of claim 1, wherein the mutant Cullin1 gene comprises the nucleotide sequence encoding the protein comprising SEQ ID NO: 4 but having an aspartic acid (D) at position 518 of SEQ ID NO: 4.

22. A method for producing a watermelon (*Citrullus lanatus*) plant exhibiting a compact growth phenotype comprising the steps of:

a) crossing a first *Citrullus lanatus* parent plant with a second *Citrullus lanatus* parent plant to obtain an F1 population, wherein the first *Citrullus lanatus* parent plant is the plant of claim 1;
b) optionally performing one or more rounds of selfing and/or crossing with a F1 *Citrullus lanatus* plant to obtain a further generation population;
c) selecting from the F1 population resulting from the cross of step a), or from the further generation population of step b), a *Citrullus lanatus* plant that comprises the mutant Cullin1 gene or exhibits the compact growth phenotype.

23. A method for identifying a watermelon (*Citrullus lanatus*) plant comprising a mutant Cullin1 gene encoding a protein conferring a compact growth phenotype, wherein:
the mutant Cullin1 gene comprises:
i) a nucleotide sequence which encodes a protein comprising SEQ ID NO: 4;
ii) a nucleotide sequence comprising SEQ ID NO: 3; or
iii) a nucleotide sequence encoding a protein comprising SEQ ID NO: 4 but having an aspartic acid (D) at position 518 of SEQ ID NO: 4;
the method comprises:
detecting by genetic analysis in the genome of the *Citrullus lanatus* plant nucleotide i), nucleotide ii), or nucleotide iii), thereby identifying the *Citrullus lanatus* plant comprising the mutant Cullin1 gene;
and optionally testing the plant identified as comprising the mutant Cullin1 gene for exhibiting the compact growth phenotype.

24. The plant of claim 9, wherein the agronomically elite *Citrullus lanatus* plant is an inbred line or a double haploid.

* * * * *